(12) United States Patent
Iwata

(10) Patent No.: US 10,620,885 B2
(45) Date of Patent: Apr. 14, 2020

(54) PRINTING APPARATUS FOR PERFORMING DOUBLE-SIDED PRINTING OF A SCANNED DOCUMENT THAT CONTAINS SHEETS HAVING DIFFERENT SIZES

(71) Applicant: SEIKO EPSON CORPORATION, Tokyo (JP)

(72) Inventor: Akira Iwata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/042,107

(22) Filed: Jul. 23, 2018

(65) Prior Publication Data
US 2019/0034129 A1    Jan. 31, 2019

(30) Foreign Application Priority Data

Jul. 25, 2017 (JP) .................. 2017-143298
Jul. 25, 2017 (JP) .................. 2017-143300

(51) Int. Cl.
*G06F 3/12* (2006.01)
*G06K 15/02* (2006.01)

(52) U.S. Cl.
CPC .......... *G06F 3/1205* (2013.01); *G06F 3/1208* (2013.01); *G06F 3/1252* (2013.01); *G06K 15/1868* (2013.01); *G03G 2215/00586* (2013.01); *G03G 2215/00734* (2013.01); *G06K 15/1843* (2013.01); *G06K 2215/0017* (2013.01)

(58) Field of Classification Search
CPC ..... G06F 3/1205; G06F 3/1252; G06F 3/1208
See application file for complete search history.

(56) References Cited

U.S. PATENT DOCUMENTS

| | | | |
|---|---|---|---|
| 2004/0125394 A1* | 7/2004 | Terao ............... | B41J 11/003 358/1.13 |
| 2007/0005561 A1* | 1/2007 | Sakura ............... | G06F 3/1205 |
| 2009/0227436 A1* | 9/2009 | Takahashi ........... | B65H 45/142 493/420 |
| 2012/0120421 A1* | 5/2012 | Mochizuki ........... | G03G 15/50 358/1.9 |
| 2013/0135630 A1* | 5/2013 | Miyajima ............. | B41L 39/16 358/1.6 |

FOREIGN PATENT DOCUMENTS

JP    11-164125 A    6/1999

* cited by examiner

*Primary Examiner* — Benjamin O Dulaney
(74) *Attorney, Agent, or Firm* — Workman Nydegger

(57) ABSTRACT

A printing apparatus having a copying function includes a document feeder that feeds a document, an image reading section that scans the document fed from the document feeder and generates image data of the document, a printing section that performs printing on paper in accordance with the image data, and a controller. The controller performs an avoidance process of avoiding performing the printing in which a size of a sheet of the document and a size of the paper do not match against an intention of a user, in a case where a setting is made in which the document, on which single-sided printing is performed, is printed on both sides of the paper to perform double-sided printing, and the document includes sheets having different sizes and includes an odd number of successive sheets with an identical size.

8 Claims, 7 Drawing Sheets

PRINTING APPARATUS FOR PERFORMING DOUBLE-SIDED PRINTING OF A SCANNED DOCUMENT THAT CONTAINS SHEETS HAVING DIFFERENT SIZES

BACKGROUND

1. Technical Field

The present invention relates to a printing apparatus or the like having a copying function, and particularly, to a printing apparatus or the like capable of providing a desired printing result satisfying user needs in mixed printing.

2. Related Art

Printing apparatuses having a copying function are prevailing. In recent years, functionality of such printing apparatuses has been expanded, and it is even possible to copy a document having mixed sheets of paper of different sizes and different orientations in the vertical and horizontal directions. It is also possible to perform double-sided printing by using a document on which single-sided printing is performed.

In relation to these functions, JP-A-11-164125 describes that in a case where mixed printing is performed with sheets in the vertical direction and sheets in the horizontal direction in a document being set, printing of a page whose orientation is different from the orientation of the copy paper specified by the user is performed such that the image data obtained by scanning the page is rotated by 90 degrees.

However, in a case where complex copy printing as described above is performed, specifically, in a case where mixed printing of a document having mixed sheets where the sheets have different sizes and different orientations in the vertical and horizontal directions as well as double-sided printing by using the document on which single-sided printing is performed are performed, and when the document successively includes an odd number of sheets with an identical size, there is a possibility that the printing result desired by the user is not provided. There are some apparatuses dealing with such a case, where the user inserts a blank sheet between sheets of the document so that an even number of sheets with an identical size are successively included.

However, such a countermeasure causes a user to deal with a troublesome situation and the user has less freedom in dealing with such situation. Therefore, it is desirable that a function with enhanced user-friendliness be provided.

SUMMARY

An advantage of some aspect of the invention is to provide a printing apparatus or the like having a copying function, and more particularly, to a printing apparatus or the like capable of providing a desired printing result satisfying user needs without causing inconvenience to the user in mixed printing.

According to an aspect of the invention, a printing apparatus having a copying function includes a document feeder that feeds a document, an image reading section that scans the document fed from the document feeder and generates image data of the document, a printing section that performs printing on paper in accordance with the image data, and a controller. The controller performs an avoidance process of avoiding performing the printing in which a size of a sheet of the document and a size of the paper do not match against an intention of a user, in a case where a setting is made in which the document, on which single-sided printing is performed, is to be printed on both sides of the paper to perform double-sided printing, and the document includes sheets having different sizes and includes an odd number of successive sheets with an identical size.

According to the above aspect, it is possible to avoid a print result that is not intended by the user in mixed printing.

Further, it is preferable that the avoidance process include generating the image data of a blank sheet with a size identical to a size of the odd number of successive sheets and inserting the image data immediately after image data of the odd number of successive sheets.

In this case, it is possible to provide a print result in which the document sheet size and the paper size match without causing inconvenience to the user.

Further, it is preferable that the avoidance process include displaying a screen for causing the user to select whether to change the double-sided printing to single-sided printing, and the controller perform a process in response to a selection operation on the screen.

In this case, the avoidance process reflecting the user intention is performed.

Further, it is preferable that the avoidance process include displaying a screen for causing the user to select whether to cancel the printing, and the controller perform a process in response to a selection operation on the screen.

In this case, the avoidance process reflecting the user intention is performed.

Further, it is preferable that the controller do not perform the avoidance process in a case where no sheet is present immediately after the odd number of successive sheets.

In this case, the process can be performed efficiently.

Further, it is preferable that the avoidance process include displaying a screen for causing the user to give an instruction not to change the setting, and upon receiving the instruction, the printing apparatus print a page immediately after a last page of the odd number of successive sheets on a back side of the paper on which the last page of the odd number of successive sheets is printed.

In this case, the printing process reflecting the user intention is performed.

According to another aspect of the invention, a printing method is provided in a printing apparatus including a document feeder that feeds a document, an image reading section that scans the document fed from the document feeder and generates image data of the document, and a printing section that performs printing on paper in accordance with the image data. The printing method includes performing a process of avoiding performing the printing in which a size of a sheet of the document and a size of the paper do not match against a user intention, in a case where a setting is made in which the document, on which single-sided printing is performed, is printed on both sides of the paper to perform double-sided printing, and the document includes sheets having different sizes and includes an odd number of successive sheets with an identical size.

Further objects and features of the present invention will become apparent from the embodiments of the invention described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
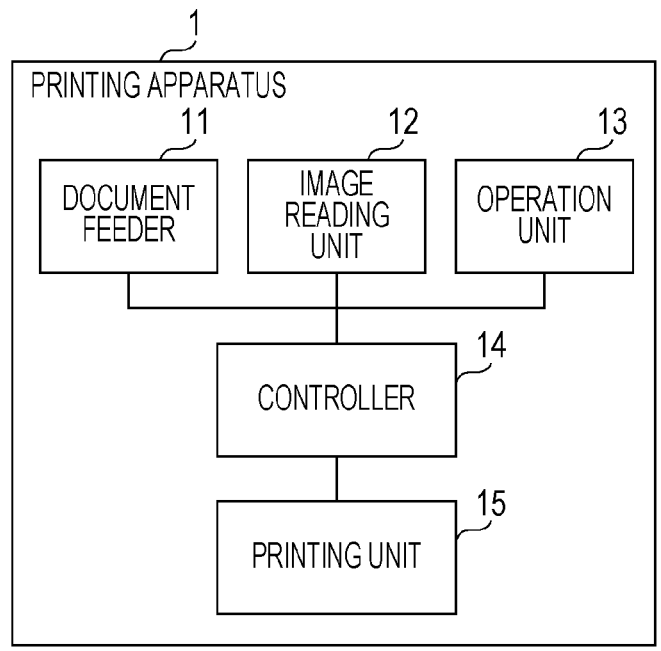
FIG. 1 is a schematic diagram of a printing apparatus according to an embodiment of the present invention.

The embodiments of the invention will be described below with reference to the drawings. However, such embodiments are not intended to limit the technological scope of the invention. Note that in the drawings, the same or similar components are denoted by the same reference numerals or reference symbols.

FIG. 1 is a schematic diagram of a printing apparatus according to an embodiment of the present invention. The printing apparatus 1 illustrated in FIG. 1 is a printing apparatus according to an embodiment of the present invention, and the printing apparatus 1 includes a copying function, and performs a process of avoiding performing printing on paper which does not match a document against the user intention in a case where mixed printing is performed and double-sided printing is performed from the document on which single-sided printing has been performed, and in a case where the document successively includes an odd number of sheets with an identical size. As a result, even when complex copying is performed, the printing result desired by the user can be obtained, and user-friendliness can be improved.

In addition, the printing apparatus 1 specifies a sheet in detail, compared with apparatuses of the related art, even when the document includes the sheet of a non-standard size and implements measures which satisfy user needs. Therefore, in this respect, the degree of freedom is increased and user-friendliness can be improved.

In this specification, printing when the document to be copied includes sheets having different sheet sizes or different directions, that is, printing when the document has mixed sheets whose image data (scanned data), which is generated by scanning with an image reading section 12 described later, differs in terms of its horizontal and vertical sizes, is referred to as mixed printing. In addition, copy printing for generating a double-sided printing copy from a document on which single-sided printing has been performed is simply referred to as single-sided-to-double-sided printing.

The printing apparatus 1 is, for example, a so-called multifunction peripheral having a copying function (copy function). The printing apparatus 1 has a function of performing mixed printing and single-sided-to-double-sided printing described above in copy printing.

As illustrated in FIG. 1, the printing apparatus 1 includes a document feeder 11, the image reading section 12, an operation section 13, a controller 14, and a printing section 15.

The document feeder 11 includes a manual-feed tray on which a user places a document, a transport device that feeds sheets of the document placed on the manual-feed tray to the image reading section 12 one by one (one page at a time), and the like.

The image reading section 12, which includes a CCD camera, scans the document sent from the document feeder 11, and generates image data (scanned data) of the document.

The operation section 13 is a user interface of the printing apparatus 1 and includes operation buttons, a monitor display, and the like. In a case where the user utilizes the copying function, various settings are performed using the operation section 13.

The printing section 15 includes a printing mechanism which performs printing on paper or the like (printing medium) in accordance with an instruction from the controller 14. Specifically, the printing section 15 includes a feeding port for paper, a transport section for paper, a print head, and the like. In addition, the printing section 15 includes a paper inverting device for performing double-sided printing.

The controller 14 is a controller that controls each section of the printing apparatus 1, and controls operations of the document feeder 11, the image reading section 12, the operation section 13, and the printing section 15. Although not illustrated, the controller 14 includes as a hardware configuration a CPU, a RAM, a ROM, a NVRAM, an ASIC (Application Specific Integrated Circuit), and the like.

A feature of the printing apparatus 1 is the control of the controller 14 in mixed printing, the specific content of which will be described later. Note that the controller 14 performs the process by cooperatively operating a program instructing the controller 14 on the process, a CPU operating according to the program, and a ROM, a RAM, and a NVRAM, which store the program and the like.

As described above, while the printing apparatus 1 according to the embodiment of the invention having the above-described configuration is characterized by the process of mixed printing and the process for the document with a sheet of a non-standard size, the process of general copy printing is as follows.

When a user makes a copy (when generating a copy), the user first places the document on the manual-feed tray of the document feeder 11, performs a desired setting operation on the operation section 13, and performs (starts) an operation of copying with operation buttons of the operation section 13. In response to this operation, the document feeder 11 sends sheets of the set document to the image reading section 12 one by one (one page at a time). The image reading section 12 scans the sent sheets and generates the scanned data thereof. The document after scanning is discharged by the document feeder 11. Such scanning and discharge are performed for all pages.

The scanned data of each page of the document is sent to the controller 14. The controller 14 checks each sheet size in accordance with the size of the scanned data thereof, and selects a feeding port for the paper matching the size. Thereafter, in accordance with the scanned data, the controller 14 causes the printing section 15 to perform copy printing on the selected paper.

Figure 2:
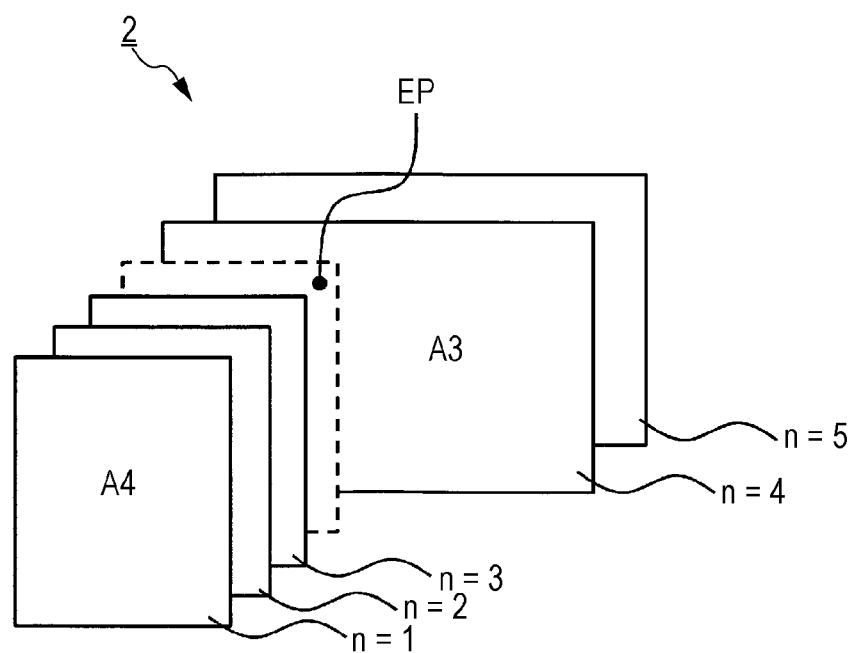
FIG. 2 is a schematic diagram of an example of a document for mixed printing.

Next, the process of mixed printing will be described. Here, the mixed printing of a document in which an A4 sheet and an A3 sheet are mixed will be described. FIG. 2 is a schematic diagram of an example of a document for mixed printing. The document 2 as the example illustrated in FIG. 2 includes three pages (sheets) of the A4 size successively and then two pages of the A3 size successively. In FIG. 2, the n value of each page indicates the page number of the document. The printing apparatus 1, when each page is scanned by the image reading section 12, attaches this n value to the scanned data.

In the mixed printing, in a case where a document successively includes an odd number of sheets with an identical size (hereinafter referred to as a document with an odd number of successive sheets), and single-sided-to-double-sided printing is determined, inconsistency occurs between sheets of the document and paper to be used unless a particular process is performed. In the case of the example in FIG. 2, after a page with n=3 is printed on the front side of A4 paper, an A3 page with n=4 may be printed on the back side of the A4 paper.

Thus, the printing apparatus 1 performs a process of avoiding such printing (hereinafter referred to as an avoidance process). The printing apparatus 1 provides a plurality of options for the avoidance process and performs the process according to an option selected by the user. One of the options is, in a case where there is another sheet immediately after an odd number of successive sheets, to add a blank sheet with a size identical to that of the successive sheets immediately after the odd number of successive sheets. In the example in FIG. 2, the sheet indicated by EP corresponds to this additional sheet. This makes it possible to avoid the above-described problematic printing. The blank sheet is scanned and the data thereof is added to scanned data.

In addition, others of the options include switching to single-sided printing, continuously performing printing, and cancellation of copying.

Another feature of the printing apparatus 1 relates to a process when a sheet of a non-standard size is included in the document. The printing apparatus 1 identifies the scanned sheet as "A4", "A3", "non-standard size (small)", or "non-standard size (large)" on the basis of the dimensions of scanned data and a predetermined range to be regarded as A4 or A3. Then, the printing apparatus 1 performs copy printing on appropriate paper on the basis of the identification result and the instruction of the user.

FIGS. 3 to 8 are flowcharts illustrating a procedure of copy printing when a mixed printing function is active (effective). Hereinafter, the specific process in the case of mixed printing will be described with reference to FIGS. 3 to 8.

First, a process is started when a copy start operation is performed by the user via the operation section 13 in a state in which the mixed printing function is enabled by the user via the operation section 13.

Figure 3:
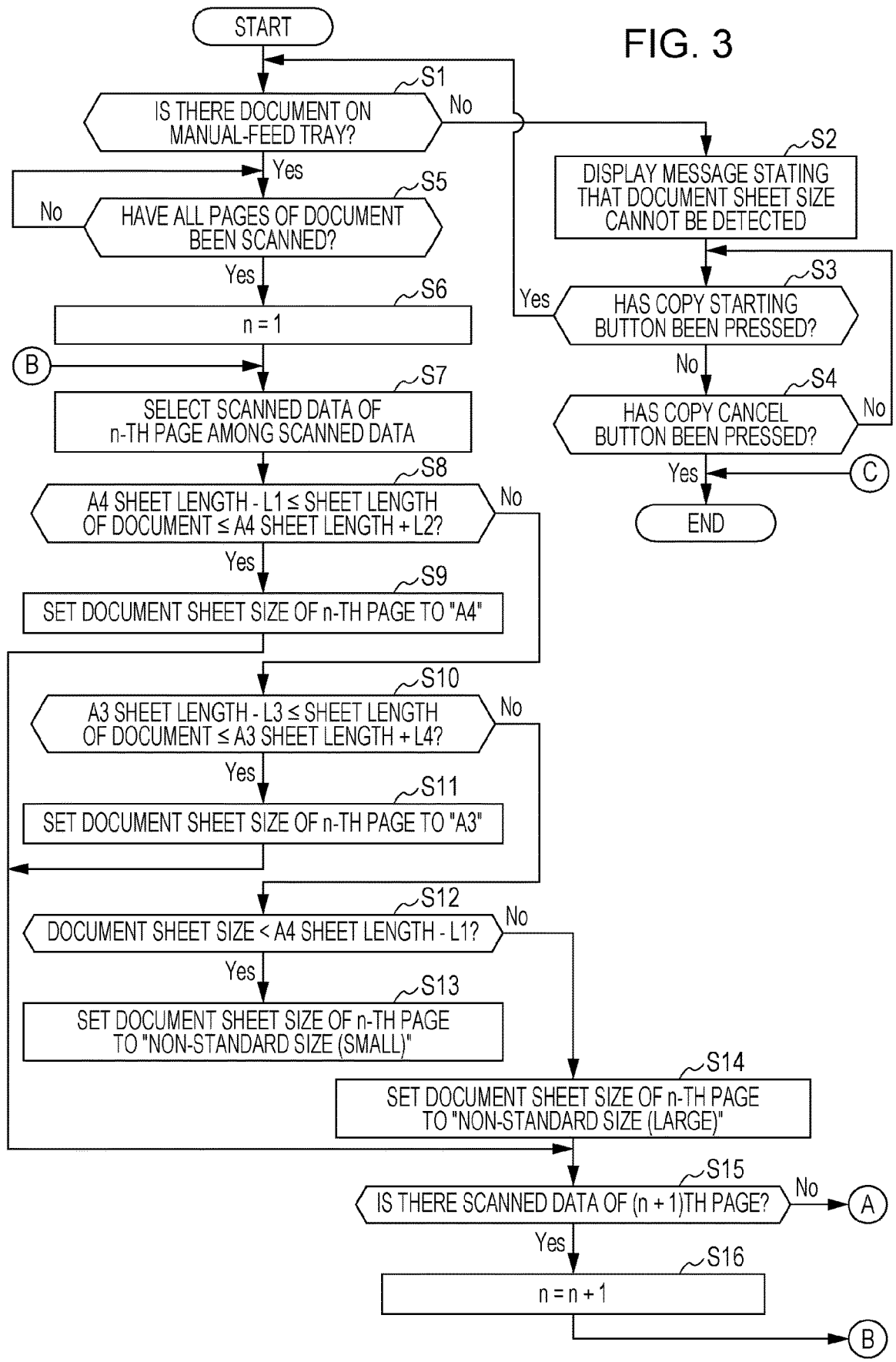
FIG. 3 is a flowchart illustrating a procedure of copy printing when the mixed printing function is active (effective).

Next, on the basis of detection by a sensor provided in the manual-feed tray, the controller 14 checks whether a document is present on the manual-feed tray (whether the document is set) (Step S1 in FIG. 3). In a case where no document is present, a message stating that a document sheet size cannot be detected is displayed on a monitor display of the operation section 13 (Step S2 in FIG. 3). Note that the document sheet size means a sheet size of paper of the document.

Thereafter, the controller 14 checks whether a copy start button (perform copy button) of the operation section 13 has been pressed (Step S3 in FIG. 3), and in a case where it has been pressed, determines that the document has been set, and the process returns to Step S1. On the other hand, in a case where the copy start button has not been pressed ("No" in Step S3 in FIG. 3) and a copy cancel button of the operation section 13 has been pressed ("Yes" in Step S4 in FIG. 3), the controller 14 ends the copy printing process.

In a case where the document is present on the manual-feed tray ("Yes" in Step S1 in FIG. 3), the controller 14 instructs the document feeder 11 and the image reading section 12 to transport and scan all pages of the document set on the manual-feed tray one by one ("Yes" in Step S5 in FIG. 3).

Through this process, scanned data (image data) of each page of the document is generated with the above-described n value added.

The controller 14 performs a process (identification process) for judging the document sheet size for each scanned data generated. First, the controller 14 appropriately performs the process of the following Steps S8 to S15 for all pages (Step S16 in FIG. 3) starting with the first page, that is, the page with n=1 (Step S6 in FIG. 3).

In Step S8, on the basis of the size of the scanned data, the controller 14 checks whether the sheet length of the document is within a range regarded as A4 (Step S8 in FIG. 3). Specifically, the controller 14 judges whether the following expression holds using the predetermined lengths L1 and L2. In this case, the sheet length is the length of the long side of a rectangle sheet.

$$(A4 \text{ sheet length} - L1) \text{sheet length of the document} (A4 \text{ sheet length} + L2)$$

As a result of the judgement, in a case where the above expression holds, that is, in a case where the sheet length of the document is within a range regarded as A4 ("Yes" in Step S8 in FIG. 3), the controller 14 sets the document sheet size of the n-th page (the n-th page of the document) to "A4" (Step S9 in FIG. 3).

On the other hand, in a case where the above expression does not hold, that is, in a case where the sheet length of the document is not within a range regarded as A4 ("No" in Step S8 in FIG. 3), the controller 14 checks whether the sheet length of the document is within a range regarded as A3 in accordance with the size of scanned data (Step S10 in FIG. 3). Specifically, the controller 14 judges whether the following expression holds using the predetermined lengths L3 and L4.

$$(A3 \text{ sheet length} - L3) \text{sheet length of document} (A3 \text{ sheet length} + L4)$$

As a result of the judgement, in a case where the above expression holds, that is, in a case where the sheet length of the document is within a range regarded as A3 ("Yes" in Step S10 in FIG. 3), the controller 14 sets the document sheet size of the n-th page (the n-th page of the document) to "A3" (p S11 in FIG. 3).

On the other hand, in a case where the above expression does not hold, that is, in a case where the sheet length of the document is not within a range regarded as A3 ("No" in Step S10 in FIG. 3), the controller 14 determines that the document sheet size of the n-th page is not regarded as A4 or A3 but as a non-standard size. Then, the controller 14 judges whether the document sheet size is smaller (shorter) than the lower limit value which can be regarded as A4 in accordance with the scanned data (Step S12 in FIG. 3). Specifically, the controller 14 judges whether the following expression holds.

$$\text{document sheet size} < (A4 \text{ sheet length} - L1)$$

As a result of the judgement, in a case where the above expression holds, that is, in a case where the document sheet size is smaller than the lower limit value which can be regarded as A4 ("Yes" in Step S12 in FIG. 3), the controller 14 sets the n-th page (the document sheet size of the n-th page) to "non-standard size (small)" (Step S13 in FIG. 3).

On the other hand, in a case where the above expression does not hold, that is, in a case where the document sheet size is not smaller than the lower limit value which can be regarded as A4 ("No" in Step S12 in FIG. 3), the controller 14 sets the n-th page (the document sheet size of the n-th page) to "non-standard size (large)" (Step S14 in FIG. 3).

In this manner, when the judgement of the document sheet size is completed for all pages, the controller 14 performs a process for deciding a print mode. The printing apparatus 1 has three print modes of "standard print mode", "non-standard print mode", and "non-standard non-print mode".

Figure 4:
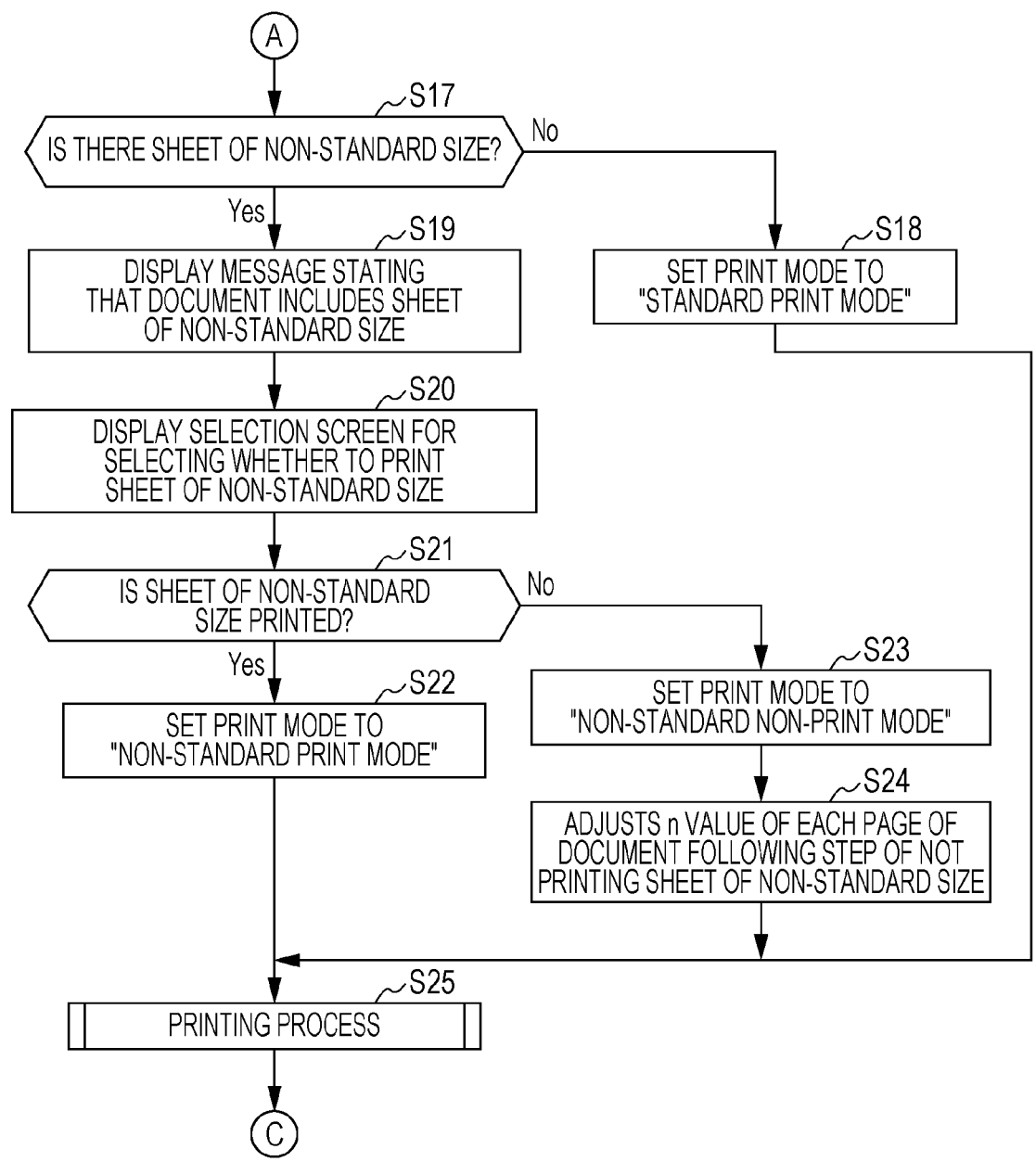
FIG. 4 is a flowchart illustrating a procedure of copy printing when the mixed printing function is active (effective).

First, the controller 14 determines whether the document includes a sheet of a non-standard size (Step S17 in FIG. 4). Specifically, the controller 14 checks whether each page of the document has "non-standard size (small)" or "non-standard size (large)".

As a result of the determination, in a case where the document does not include a sheet of a non-standard size ("No" in Step S17 in FIG. 4), the controller 14 sets the print mode to "standard print mode" (Step S18 in FIG. 4). Thereafter, the process proceeds to Step S25.

On the other hand, in a case where the document includes a sheet of a non-standard size ("Yes" in Step S17 in FIG. 4), the controller 14 displays on the monitor display of the operation section 13 a message stating that the document includes the sheet of the non-standard size (Step S19 in FIG. 4).

Thereafter, the controller 14 displays on the monitor display of the operation section 13 a selection screen for selecting whether to print the sheet of a non-standard size (Step S20 in FIG. 4).

Next, upon receiving a user operation on the selection screen, the controller 14 determines whether to print the sheet of a non-standard size (Step S21 in FIG. 4), and when printing the sheet corresponding to a non-standard size ("Yes" in Step S21 in FIG. 4), sets the print mode to "non-standard print mode" (Step S22 in FIG. 4). Thereafter, the process proceeds to Step S25.

On the other hand, when not printing the sheet of a non-standard size ("No" in Step S21 in FIG. 4), the controller 14 sets the print mode to "non-standard non-print mode" (Step S23 in FIG. 4). Next, the controller 14 adjusts the n value of each page of the document following the Step of not printing the sheet of a non-standard size (Step S24 in FIG. 4). Specifically, the controller 14 deletes the n value of the sheet (page) of the non-standard size and performs a change so that the n value of the sheet (page) other than the sheet of the non-standard size represents a successive number starting at 1. Thereafter, the process proceeds to Step S25.

In Step S25, the printing process is performed in accordance with the above setting, and the copy printing process is ended. Hereinafter, the specific printing process will be described.

Figure 5:
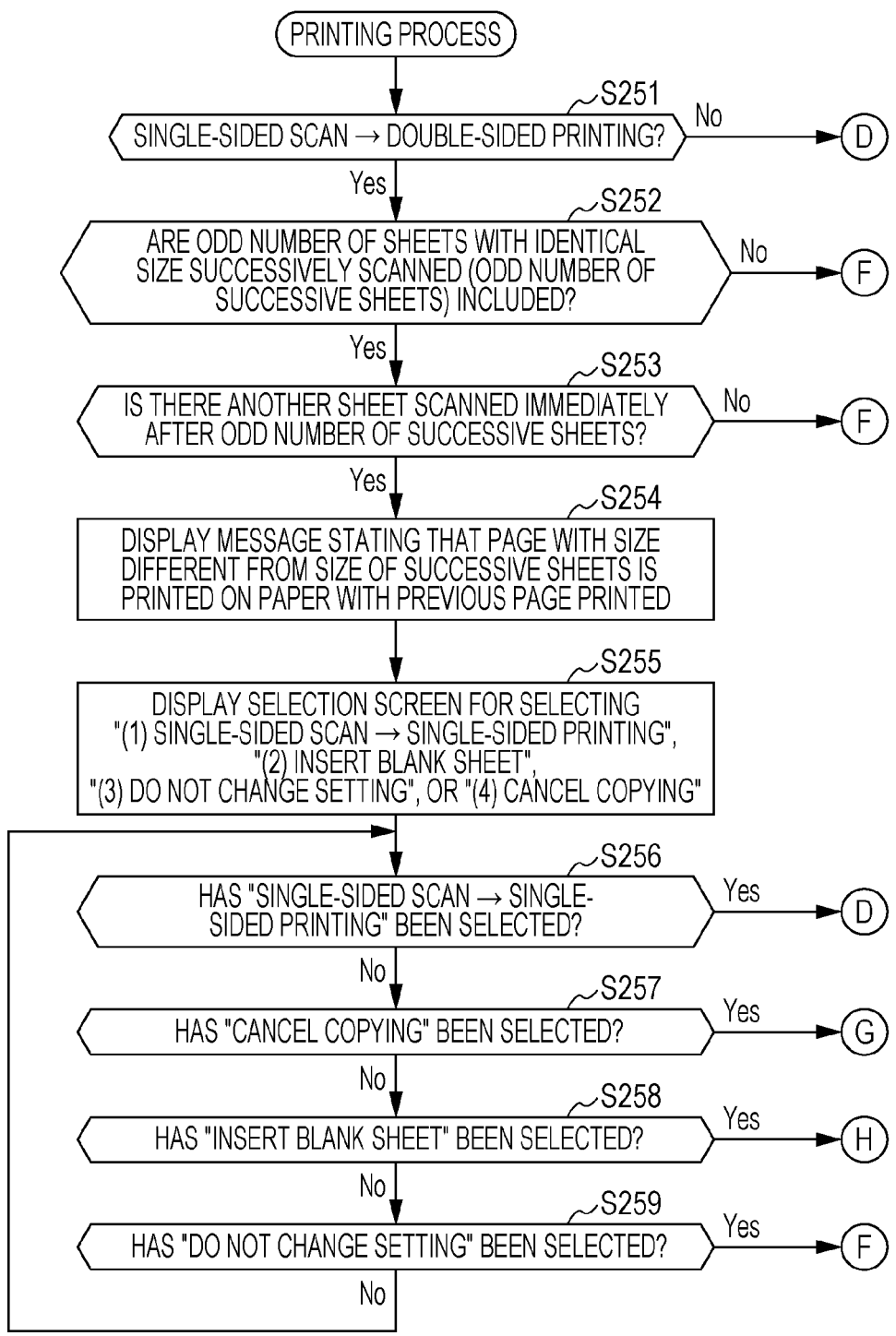
FIG. 5 is a flowchart illustrating a procedure of copy printing when the mixed printing function is active (effective).

First, the controller 14 determines whether the copy printing is set to "single-sided-to-double-sided printing" (Step S251 in FIG. 5). Specifically, the controller 14 makes a determination from the printing conditions (setting information), which are set before the copy start button is pressed by the user.

Figure 6:
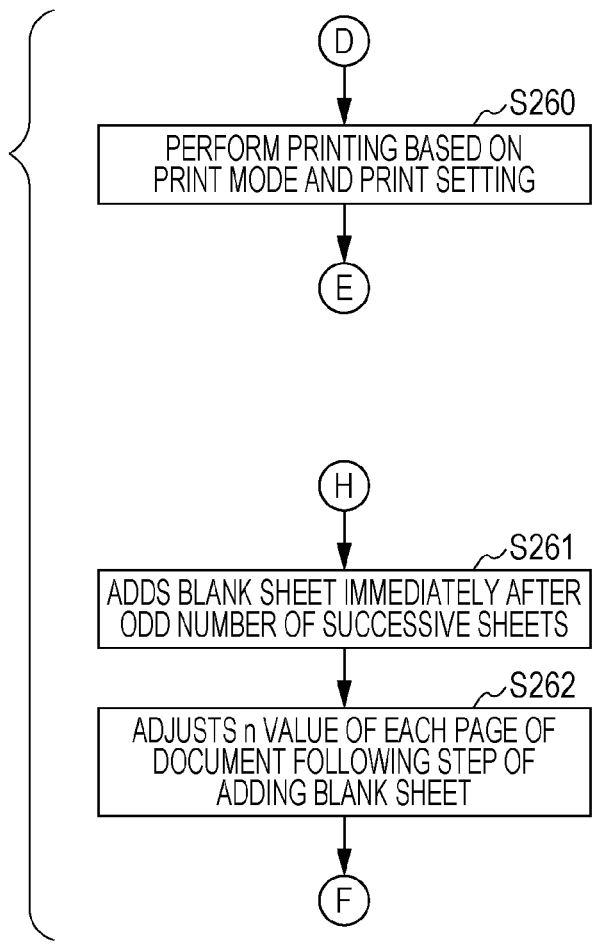
FIG. 6 is a flowchart illustrating a procedure of copy printing when the mixed printing function is active (effective).

As a result of the determination, in a case where the copy printing is not set to "single-sided-to-double-sided printing" ("No" in Step S251 in FIG. 5), the controller 14 controls the printing section 15 on the basis of the print mode and setting information that have already been set so that the printing section 15 performs printing on appropriate paper (Step S260 in FIG. 6). As a result, the printing process ends.

On the other hand, as a result of the determination, in a case where the copy printing is set to "single-sided-to-double-sided printing" ("Yes" in Step S251 in FIG. 5), the controller 14 determines whether an odd number of successive sheets are included in the document (Step S252 in FIG. 5). Specifically, the controller 14 performs the determination on the basis of the set document sheet size and the n value of scanned data corresponding thereto. Note that the controller 14 performs the determination in which a sheet whose document sheet size is set to "non-standard size (small)" or "non-standard size (large)" in scanned data having the n value is regarded as "A4" for "non-standard size (small)" and "A3" for "non-standard size (large)".

As a result of the determination, in a case where the document does not include an odd number of successive sheets ("No" in Step S252 in FIG. 5), the process proceeds to Step S263.

As a result of the determination, in a case where the document includes an odd number of successive sheets ("Yes" in Step S252 in FIG. 5), the controller 14 determines whether there is another sheet immediately after the odd number of successive sheets, in other words, whether there is scanned data of another sheet (Step S253 in FIG. 5), and in a case where no data is present ("No" in Step S253 in FIG. 5), the process proceeds to Step S263.

On the other hand, in a case where there is another sheet immediately after the odd number of successive sheets ("Yes" in Step S253 in FIG. 5), the controller 14 displays on the monitor display of the operation section 13 a message stating that another page with a size different from that of the successive sheets is printed on paper on which the previous page has been printed (Step S254 in FIG. 5). For example, a message stating that an A3 page is printed on the back side of A4 paper is displayed.

Subsequently, the controller 14 displays on the monitor display of the operation section 13 a selection screen for selecting an option from four options regarding a countermeasure after the message is displayed (Step S255 in FIG. 5). As described above, the four options are "(1) change to single-sided printing", "(2) insert a blank sheet", "(3) do not change setting", and "(4) cancel copying".

Upon receiving a user selection operation on the selection screen, in a case where "(1) change to single-sided printing" is selected from the four options ("Yes" in Step S256 in FIG. 5), the controller 14 controls the printing section 15 on the basis of the print mode and setting information that have already been set so that the printing section 15 performs printing on appropriate paper (Step S260 in FIG. 6). As a result, the printing process ends.

In a case where "(4) cancel copying" is selected from the four options on the selection screen ("Yes" in Step S257 in FIG. 5), the controller 14 ends the printing process.

In a case where "(2) insert a blank sheet" is selected from the four options on the selection screen ("Yes" in Step S258 in FIG. 5), the controller 14 adds a blank sheet immediately after the odd number of successive sheets (Step S261 in FIG. 6). More specifically, the controller 14 generates scanned data with a size identical to that of the odd number of successive sheets and adds the scanned data immediately after the last sheet of the odd number of successive sheets.

Next, the controller 14 adjusts the n value of each page of the document following the step of adding the blank sheet (Step S262 in FIG. 6). Specifically, the controller 14 attaches an n value to the scanned data of the blank sheet, which has been added, so that the added blank sheet has a successive number, and the controller 14 changes the n value of the subsequent scanned data after the blank sheet so that the subsequent scanned data has a successive number. Thereafter, the process proceeds to Step S263.

In a case where "(3) do no change setting" is selected from the four options on the selection screen ("Yes" in Step S259 in FIG. 5), the process proceeds to Step S263.

Figure 7:
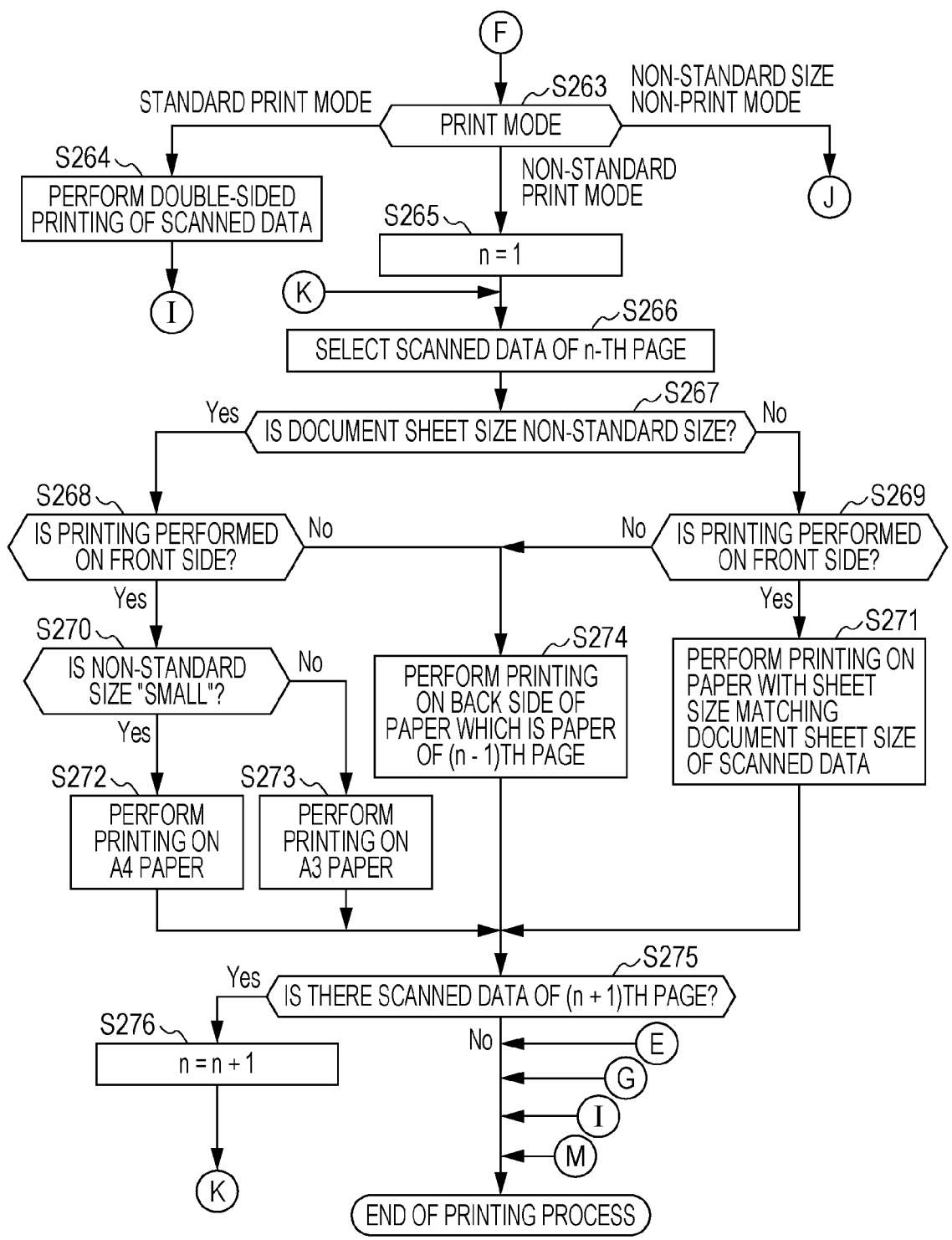
FIG. 7 is a flowchart illustrating a procedure of copy printing when the mixed printing function is active (effective).

In Step S263, the controller 14 determines the print mode which has been set (Step S263 in FIG. 7). In a case where the print mode which has been set is "standard print mode", the controller 14 controls the printing section 15 in accordance with the scanned data and the setting information of the document so that the printing section 15 performs double-sided printing on appropriate paper (Step S264 in FIG. 7). As a result, the printing process ends.

In a case where the print mode which has been set is "non-standard print mode", the process of Steps S266 to S274 is appropriately performed with respect to all the scanned data (each page of the document) starting from the first page (n=1) (Step S265 in FIG. 7).

The controller 14 performs the following process for each page. First, the controller 14 selects the scanned data of the n-th page (Step S266 in FIG. 7), and determines whether the document sheet size of the n-th page is non-standard size (Step S267 in FIG. 7). Specifically, the controller 14 checks whether the document sheet size is "non-standard size (small)" or "non-standard sheet size (large)".

As a result of the determination, in a case where the document sheet size is non-standard size ("Yes" in Step S267 in FIG. 7), when the controller 14 performs printing of the n-th page on the back side of paper ("No" in Step S268 in FIG. 7), the controller 14 performs printing of the n-th page on the back side of the paper which is paper of the previous page ((n−1)th page) (Step S274 in FIG. 7), and ends the printing of the n-th page.

When the controller 14 performs printing of the n-th page on the front side of paper ("Yes" in Step S268 in FIG. 7), the controller 14 determines whether the document sheet size, which has been set, is "non-standard size (small)" (Step S270 in FIG. 7). As a result of the determination, in a case where the document sheet size is "non-standard size (small)" ("Yes" in Step S270 in FIG. 7), the controller 14 performs printing of the n-th page on A4 paper (Step S272 in FIG. 7), and ends the printing of the n-th page. As a result of the determination, in a case where the document sheet size is "non-standard size (large)" ("No" in Step S270 in FIG. 7), the controller 14 performs printing of the n-th page on A3 paper (Step S273 in FIG. 7), and ends the printing of the n-th page.

In Step S267, in a case where the document sheet size is not non-standard size ("No" in Step S267 in FIG. 7), when the controller 14 performs printing of the n-th page on the back side of paper ("No" in Step S269 in FIG. 7), the controller 14 performs printing of the n-th page on the back side of the paper which is paper of the previous page ((n−1)th page) (Step S274 in FIG. 7), and ends the printing of the n-th page. When the controller 14 performs printing of the n-th page on the front side of paper ("Yes" in Step S269 in FIG. 7), the controller 14 performs printing on paper with a sheet size matching the document sheet size of scanned data of the n-th page (Step S271 in FIG. 7), and ends the printing of the n-th page.

Figure 8:
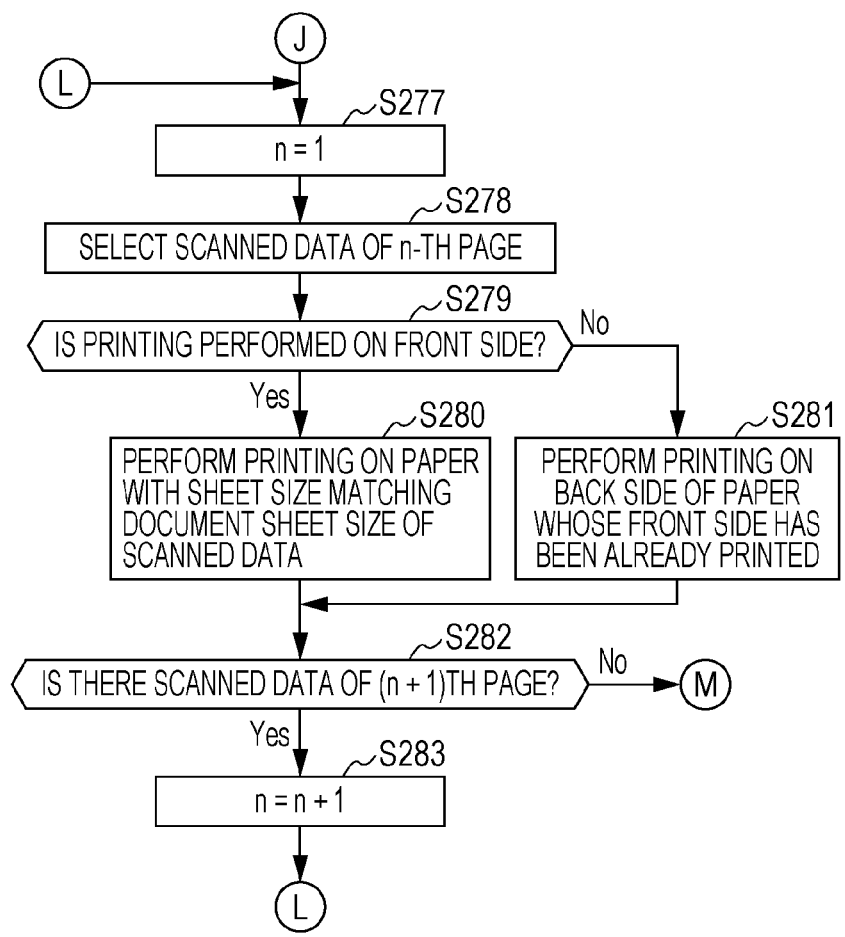
FIG. 8 is a flowchart illustrating a procedure of copy printing when the mixed printing function is active (effective).

Returning to Step S263, in a case where the print mode which has been set is "non-standard non-print mode", the process of Steps S278 to S281 is appropriately performed with respect to all the scanned data (each page of the document) starting from the first page (n=1) (Step S277 in FIG. 8).

The controller 14 performs the following process for each page. First, the controller 14 selects the scanned data of the n-th page (Step S278 in FIG. 8), and in a case where the controller 14 performs printing of the n-th page on the back side of paper ("No" in Step S279 in FIG. 8), the controller 14 performs printing of the n-th page on the back side of the paper which is paper of the previous page ((n−1)th page), that is, the back side of the paper whose front side has been already printed (Step S281 in FIG. 8), and ends the printing of the page. When the controller 14 performs printing of the n-th page on the front side of paper ("Yes" in Step S279 in FIG. 8), the controller 14 performs printing on paper with a sheet size matching the document sheet size of scanned data of the n-th page (Step S280 in FIG. 8), and ends the printing of the n-th page.

In this manner, the printing process is ended for all the modes.

In the above description, the document sheet size of non-standard size is classified as "non-standard size (small)" or "non-standard size (large)", and when performing printing, A4 paper and A3 paper are used respectively. The non-standard size may be classified as a single category and in a case where a sheet of a non-standard size is printed, A3 paper may be used for any non-standard size.

Mixed printing with A4 size and A3 size is described above as an example. Mixed printing with a combination of B4 size and B5 size, Legal size and Letter size, or 8K size and 16K size (standard size of paper used, for example, in China) or the like may be used.

As described above, in the printing apparatus 1 according to the embodiment of the invention, in a case where mixed and single-sided-to-double-sided printing is performed, the avoidance process according to user selection is performed in a case of a document with an odd number of successive sheets. Therefore, it is possible to avoiding performing printing in which the document sheet size and the paper size do not match against a user intention.

In addition, since the process of inserting a blank sheet is automatically performed, it is possible to obtain a desired print result without causing inconvenience to the user.

In addition, since the user can select whether to change to single-sided printing or to cancel copying by using the above selection screen, user-friendliness is enhanced.

In addition, even in a case of a document with an odd number of successive sheets as described above, the avoidance process is not performed in a case where there is no subsequent sheet after the successive sheets, and an efficient process can be performed.

In a case where the user selection of "do not change setting" is made without changing, for example, into setting single-sided printing, even if there is a mismatch between the document sheet size and the paper size, printing is performed without any correction. In this case, the print setting is intended by the user, and print results expected by the user are provided.

In addition, in a case where sheets of the document are sheets of a non-standard size and the sheet length is within the allowable range of the length of A4 paper or within the allowable range of the length of A3 paper, the sheets are treated as A4 size or A3 size, and in a case where the sheets are not within their allowable ranges, the sheets are treated as a non-standard size. As a result, it is possible to deal with a document including sheets of a non-standard size more finely than in the related art and to improve user-friendliness.

In addition, in a case of a document including a sheet of a non-standard size, the user can select whether to print the sheet of the non-standard size, and in a case where the sheet of the non-standard size is not printed, printing is performed except the sheet of the non-standard size. Therefore, also in this case, printing intended by the user can be performed, and user-friendliness is enhanced. In addition, in this case, it is possible to perform printing of the sheet of the non-standard size on paper with a size defined by the user.

In addition, when printing a document including a sheet of a non-standard size, it is possible to use A3 paper to perform printing. In this case, there is a high possibility that printing is performed without missing any part of the document.

In addition, in the above description, the non-standard size is classified as "non-standard size (small)" or "non-standard size (large)", and in a case where a sheet of a non-standard size is printed, the page may be printed on A4 paper or A3 paper, and it is possible to perform printing on paper with a sheet size corresponding to the document sheet size.

In the embodiment of the invention, an example in which the CPU (processor) executes each process has been described.

Here, in this specification, the CPU may be constituted by one or a plurality of CPUs, or may be constituted by one or a plurality of integrated circuits (for example, an ASIC). In addition, the CPU may be constituted by a combination of one or a plurality of CPUs and one or a plurality of integrated circuits.

The scope of the invention is not limited to the foregoing embodiments and includes the invention as described in the aspects of the invention and their equivalents.

The entire disclosure of Japanese Patent Application No. 2017-143298 and No. 2017-143300, filed Jul. 25, 2017 are expressly incorporated by reference herein.

What is claimed is:

1. A printing apparatus having a copying function and a double-sided printing function, the printing apparatus comprising:
   a document feeder configured to feed a document comprised of a plurality of single-sided sheets;
   an image reading section configured to scan each of the plurality of single-sided sheets fed from the document feeder and to generate image data of each sheet;
   a printing section configured to perform double-sided printing on paper in accordance with the image data;
   an operation section including a monitor display configured to interact with a user; and
   a controller configured to perform the following:
      determine whether the document is a specified document that includes an odd number of successive first sheets having a first size and a second sheet having a second size immediately after the odd number of successive first sheets,
      in response to the determination that the document is the specified document, cause the monitor display to display a selection screen including a plurality of options, each of which is selectable by a user, the plurality of options including:
         (1) a first option, when selected, causing the printing apparatus to perform an avoidance process of not printing the image data of the second sheet on paper having the first size; and
         (2) a second option, when selected, causing the printing apparatus not to perform the avoidance process and to perform printing of the image data of the second sheet on paper having the first size.

2. The printing apparatus according to claim 1, wherein the avoidance process includes generating the image data of a blank sheet having the first size, and inserting the image data of the blank sheet immediately after image data of the odd number of successive sheets.

3. The printing apparatus according to claim 1, wherein the avoidance process includes displaying a screen for causing the user to select whether to change the double-sided printing to single-sided printing, and the controller performs a process in response to a selection operation on the screen.

4. The printing apparatus according to claim 1, wherein the avoidance process includes displaying a screen for causing the user to select whether to cancel the printing, and the controller performs a process in response to a selection operation on the screen.

5. The printing apparatus according to claim 1, wherein the controller does not perform the avoidance process in a case where no second sheet is present immediately after the odd number of the successive first sheets.

6. The printing apparatus according to claim 1, wherein:
the first size is A4,
the second size is A3,
when the document includes a non-standard-sized sheet having a size that is different from the first size and the second size, the controller is configured to perform the following:
   evaluate a length of the non-standard-sized sheet;
   determine whether the length of the non-standard-size sheet is within a length of A4; and
   in response to the determination that the length of the non-standard-size sheet is within a length of A4, treat the non-standard-sized sheet as an A4-sized sheet.

7. The printing apparatus according to claim 6, wherein:
when the length of the non-standard-sized sheet is not within a length of A4,
   the controller is further configured to:
      determine whether the length of the non-standard-sized sheet is within a length of A3, and
      in response to the determination that the length of the non-standard-sized sheet is within a length of A3, treat the non-standard-sized sheet as an A3-sized sheet.

8. A printing method in a printing apparatus including a document feeder that feeds a document, an image reading section that scans the document fed from the document feeder and generates image data of the document, an operation section including a monitor display configured to interact with a user, and a printing section that performs printing on paper in accordance with the image data, the printing method comprising:
   setting the printing section to perform double-sided printing;
   scanning a document comprised of a plurality of single-sided sheets fed by the document feeder;
   determining whether the document is a specified document that includes an odd number of successive first sheets having a first size, and a second sheet having a second size immediately after the odd number of successive first sheets; and in response to a determination that the document is the specified document, causing the printing apparatus to perform an avoidance process of not printing the image data of the second sheet on paper having the first size, and in response to a determination that the document is not the specified document, causing the monitor display to display a selection screen including a plurality of options, each of which is selectable by a user, the plurality of options including:

(1) a first option, when selected, causing the printing apparatus to perform an avoidance process of not printing the image data of the second sheet on paper having the first size; and (2) a second option, when selected, causing the printing apparatus to perform printing of the image data of the second sheet on paper having the first size.

* * * * *